June 26, 1934.  E. M. MAY  1,964,687
COMPOSITE VALVE
Filed Oct. 23, 1931   2 Sheets-Sheet 1

INVENTOR:
Edward M. May
BY Ray _____
ATTORNEY

June 26, 1934.  E. M. MAY  1,964,687
COMPOSITE VALVE
Filed Oct. 23, 1931  2 Sheets-Sheet 2

INVENTOR:
Edward M. May
BY Ray A. Uhr
ATTORNEY

Patented June 26, 1934

1,964,687

UNITED STATES PATENT OFFICE 1,964,687

COMPOSITE VALVE

Edward M. May, Detroit, Mich.

Application October 23, 1931, Serial No. 570,647

7 Claims. (Cl. 251—162)

The invention relates to composite valves and their manufacture and especially to valves having seat-engaging parts formed of very hard, wear-resisting metal.

For various uses valves are required which are capable of prolonged use without sufficient deterioration from mechanical wear or corrosion to impair their effectiveness. This is especially true of uses in which the working conditions are such as to make renewal of a valve difficult and a thing to be avoided if possible. The known metals which have the requisite durability to meet these requirements are exceedingly hard and, in some cases at least, cannot be forged or finished by machining but must be formed by casting and finished by grinding. Furthermore, such metals, or at least some of them, tend, when cast, to have a porous interior structure and this makes it difficult to secure smooth finished seat-engaging surfaces when it is necessary to grind away the outer metal of the casting. The alloy stellite is an example of such metals and is particularly suitable, because of its great hardness and ability to resist wear and corrosion, to form the seat-engaging part of a valve of the character in question.

One of the chief objects of the present invention is the provision of a composite valve having a shank part of some suitable metal, such as steel, and a seat-engaging part of stellite or other metal of a generally similar character rigidly secured to the shank part.

Another object of the invention is the production of valves of the character in question at relatively low cost.

Other objects of the invention more or less incidental or ancillary to those above stated will be apparent from the following description, referring to the accompanying drawings.

While my invention, at least in some of its aspects, is applicable to various forms of valves, it is, in certain respects, particularly applicable to needle valves and in the accompanying drawings and the following description I disclose the invention as so applied.

In the drawings, Fig. 1 is a side view, partly in axial section, of a valve made in accordance with my invention.

Figure 1:
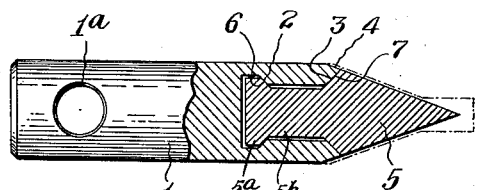

Referring to the valve construction shown in finished form by full lines in Fig. 1, and disregarding at the outset the dot-and-dash lines of said figure which have to do with the method of manufacture, said valve comprises a shank 1 formed of steel or other suitable metal having physical characteristics adapting it to be readily machined and to perform suitably the usual functions of a valve shank. If the contemplated use of the valve is such as to call for high resistance to corrosion, I prefer to make the shank of a metal such as stainless steel. The shank 1 is machined at one end to form an axially extending cavity, the walls of which are undercut at the inner end of the cavity to form a tapered shoulder 2 and are beveled at the outer end of the cavity to form an oppositely inclined tapered shoulder 3. The outer surface of the shank at the same end is formed with an outer taper or bevel 4.

To the end of the shank 1 is secured a seat-engaging tip 5 of suitable hard, wear-resisting metal such, for example, as stellite. As is well known, stellite is both exceedingly hard and highly resistant to corrosion. Because of its hardness it cannot be rolled or forged but must be formed by casing and, for the same reason, it cannot be machined but must be finished by grinding. Accordingly I secure the tip to the shank by casting it on the end thereof, the molten metal of the casting entering the cavity in the end of the shank and forming, when the metal sets, an interlocking connection between the two parts. That is, the enlarged inner end or knob $5^a$ of the tip 5 is formed with an annular taper 6 which engages the opposing taper 2 of the shank and the outer part of the tip is formed with an annular taper 7 which similarly engages the opposing taper 3 of the shank. The crystallization and temperature shrinkage of the metal of the stem $5^b$ of the tip on setting and cooling causes the tapered shoulders 6 and 7 thereof to be drawn very strongly against the opposing shoulders 2 and 3 of the shank so as to secure the tip and shank rigidly together. The contraction of the metal of the tip leaves small voids or clearances at the inner end of the tip and around the periphery thereof as shown in Fig. 1, but the firm engagement of the tapered shoulders of the tip and shank very effectively holds the two parts rigidly together. In the drawings the size of the voids is exaggerated for the sake of clearness.

The shank 1 of the valve may, if desired, be formed with a hole as at 1ª to receive a securing screw or pin.

Figure 4:
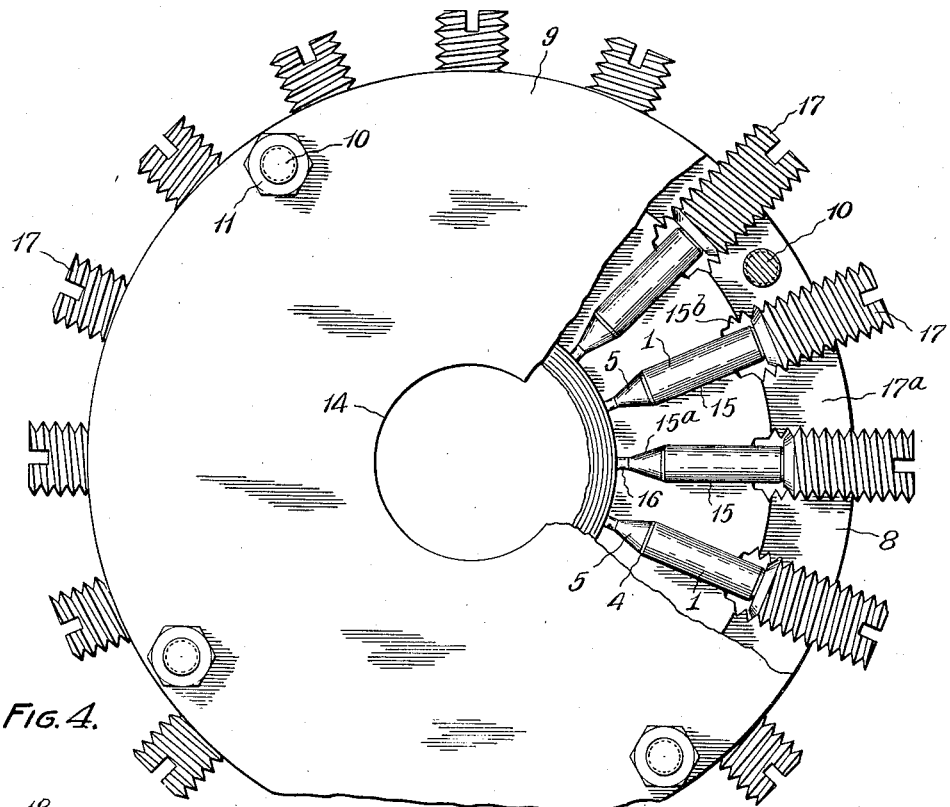
Fig. 4 is a plan view of the mold body with some parts broken away and some shown in horizontal section.

I have found special procedure necessary for the successful production of my improved valves and, in order that my invention may be satisfactorily practiced, I shall now describe a preferred method of forming the above described valve and also a mold apparatus suitable for use in carrying out the method. Said mold (Figs. 3 and 4) is designed for the simultaneous casting of a considerable number of valve tips and is adapted to employ centrifugal force for feeding the molten metal into the mold cavities. The mold body comprises a circular bottom part 8 and a similarly shaped top part 9 which is secured to the bottom part by a plurality of stud bolts 10 and nuts 11. I have found Meehanite a suitable material for the main mold parts 8 and 9, the same being a cast metal with properties between those of cast iron and cast steel. The stud bolts are secured rigidly in threaded holes in the bottom part and extend through plain holes in the top part so that the top part of the mold can readily be lifted off when the nuts 11 are removed. To provide for the rotation of the mold, the bottom part 8 is formed with a depending hub 8ª which is drilled out to fit the upper end of an upright drive shaft 12 to which the hub is detachably secured by a set screw 8ᵇ. In the construction shown, this shaft is the upwardly projecting end of the armature shaft of an electric motor 13.

Figure 3:
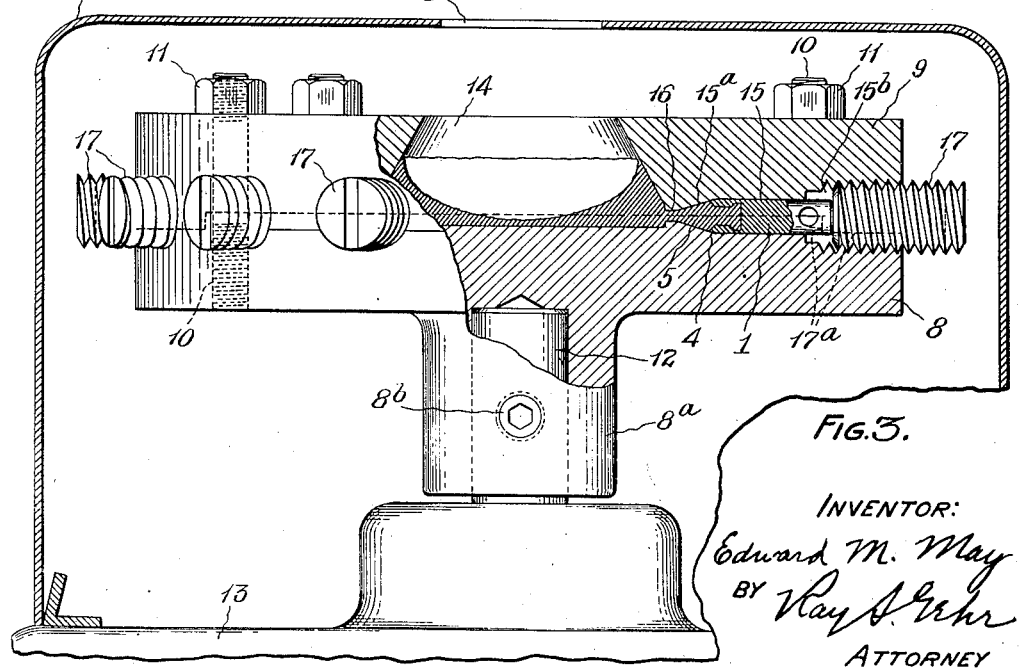
Fig. 3 is a view, partly in side elevation and partly in vertical axial section, of a novel form of mold especially suitable for making the valves.

The upper part 9 of the mold is formed with a relatively large central opening 14 which, in conjunction with the upper face of the lower part 8, forms the pouring cavity of the mold. The opening 14 preferably has its side wall undercut as shown in Fig. 3. Surrounding the opening 14 are a circumferential series of cavities 15, 15 to receive valve shanks and, in conjunction with the shanks, form a corresponding number of casting cavities for the valve tips. These mold cavities extend radially and are formed by mating depressions in the opposing faces of the lower and upper parts of the mold. Each cavity at its inner end is tapered at 15ª to form the conical or tapered part of the valve tip, and this part of the cavity is connected with the pouring cavity by means of a small cylindrical ingate 16. Each of the mold cavities is formed at its outer end with an enlarged threaded section 15ᵇ designed to receive a screw plug 17 which serves as an abutment for the outer end of the valve shank and prevents its outward displacement by the centrifugal force of the molten metal. The threaded plugs 17 can easily be turned to adjust their position according to the length of the valve shank. To avoid the necessity of screwing the plugs in each time the mold is assembled, said plugs can be carried in one or the other of the two main parts of the mold so that its adjusted position is not disturbed when the mold sections are separated. Thus, in the construction illustrated, the bottom part 8 of the mold has its upper face formed with a depression or annular rabbet 17ª and the top part 9 of the mold is formed with a corresponding annular downward extension so that the screw plugs have more than half of their peripheral surfaces embraced by the top part 9 of the mold and are therefore not separated from said mold part when it is removed from the bottom part of the mold.

A guard casing 18 having its bottom side open and its top side formed with a central aperture 18ª is adapted to be detachably mounted on the top of the casing or frame of the motor 13 so as to substantially enclose the mold and stop flying molten metal that might escape from the pouring cavity 14 when the mold is rotated.

In operating the mold, with the top part thereof removed, the prepared valve shanks 1 are placed in position on the bottom part 8 of the mold. The top part 9 is then placed in position on said bottom part and secured by nuts 11. In the initial operation of the mold, the screw plugs 17 are then inserted until their inner ends press the valve shanks as far inward as the mold cavity will permit whereupon the screws 17 are backed off slightly to provide a slight clearance between them and the valve shanks.

The form of the valve shank when it is placed in the mold is shown by the full lines in Fig. 1 except at the bevel or taper 4 where the form of the shank taper is represented by the dot-and-dash lines. Furthermore, the tapered part 15ª of the mold cavities also corresponds to the dot-and-dash lines in Fig. 1 of the drawings, thus providing for metal to be removed in finishing the tip end of the valve.

The mold is preferably heated to some extent before pouring the molten metal into it. Accordingly when the mold parts have been assembled with the valve shanks therein the entire structure including the shanks is heated to a temperature of about 750° F. This can be done with a suitable torch. The guard or cover 18 is then placed in position, the motor started and the molten stellite or other metal is poured through the aperture 18ª into the pouring cavity 14. In the use of stellite I pour the molten metal at a temperature of about 3200° F.

When the molten metal enters the pouring cavity 14 the rotation of the mold, for which I have found a speed of about 2200 R. P. M. suitable, sets up a rotary movement of the molten metal and the resultant centrifugal force feeds the molten metal under corresponding pressure through the small ingate 16 into the casting cavity formed by the mold proper and the inner ends of the valve shanks 15. Although the entering molten metal is strongly chilled by the walls of the ingate and casting cavities, the latter are always effectively filled because of the strong centrifugal force to which the molten metal is subjected. However, when the molten metal sets and cools, the combined effect of the crystallization shrinkage and the contraction due to cooling is to cause a substantial contraction of the cast metal. While this has the effect of forming the voids illustrated in Fig. 1 and above referred to, it also results in the drawing of the tapered shoulders of the cast tip strongly against the opposing shoulders of the valve shank so that the tip and shank are powerfully clamped together. The contraction also usually has the effect of rupturing the cast metal in the ingate where it joins the larger body of the cast metal remaining in the pouring cavity 14. Thus, when the mold is disassembled by removing the top part 9, the valves are ordinarily already separated from the mass of cast metal or sprue in the pouring cavity 14 and can be individually lifted or shaken out.

The valves, on removal from the mold, have the form shown by the dot-and-dash lines in Fig. 1 and the next step in the manufacture of the valve is the grinding away of the excess metal of the tip to reduce it to the form shown by full lines in Fig. 1. In grinding the tip 5 to the finished conical or taper form shown in full lines, a corresponding amount of metal at the taper 4 of the shank 1 is simultaneously removed.

On referring to Fig. 1, it will be observed that it is necessary to remove but a small amount of the cast stellite in the grinding operation. This is an important consideration because the strong chilling effect on the outer layer of the casting produces a dense, fine-grained structure free from porosity and, by so forming the cast tip that it is not necessary in the finishing operation to cut through this outer fine-grained layer of the casting, I avoid exposing the porous structure which tends to exist in the deeper, less chilled layers of the casting. In other words, I thus secure valve tips with smooth surface and avoid losses which would occur due to the exposure of porous metal if the above mentioned conditions were not secured. As shown by Fig. 1, the grinding operation penetrates to the axis of the ingate metal at the valve point. Consequently the provision of a relatively small ingate for the molten metal is essential to insure chilling and the resulting dense, fine-grained structure of the metal throughout the ingate part of the casting. Hence, with the small ingate and the heavy chilling action, the strong centrifugal force to which the molten metal is subjected plays an important part in insuring the complete filling of the mold cavity and the avoidance of imperfect castings.

Figure 2:
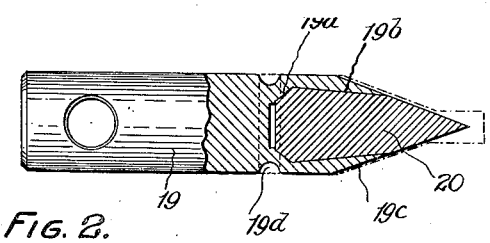
Fig. 2 is a similar view of a modified form of valve construction embodying my improvements.

While the valve construction illustrated in Fig. 1 is one that I have found especially satisfactory in practice, various other forms of construction can be used in carrying out my invention. Thus in Fig. 2 I show another form of valve which has the same general structural and functional characteristics as the valve which has been described. Here, as in the case of Fig. 1, the full lines show the finished construction of the valve while the dot-and-dash lines show the valve as it is taken from the mold after casing on the valve tip. In this last construction, the shank 19 is machined out at one end to form a cavity with walls that are undercut in relation to the end opening of the cavity, said walls comprising a short taper at 19$^a$ and a long taper at 19$^b$. The outer surface at this same end of the shank is formed with a bevel or taper 19$^c$. Into this cavity is cast a tip 20 of stellite or other similar metal. Obviously this can be done in a mold of the character above described. When the tip 20 shrinks on casting, it tends to draw away from the walls of the shank cavity and become loose. To secure the tip tightly in the cavity, I place the valve shank in swaging dies and subject it to pressure to form the circular groove 19$^d$. This forces the metal of the shank inward against the inner tapered end of the tip 20 and forces the tip outward against the inwardly tapering surface 19$^b$ of the shank, thus effectively tightening and securing the tip. After this swaging operation the valve is ready for the finishing grinding operation which effects the removal of the excess metal on the conical surface of the valve represented by the dot-and-dash lines in Fig. 2.

It will be seen that the same principles are involved in the construction and production of both forms of valves which have been described. The valve tips and shanks are so formed that the metal which must be removed from the tips to produce the finished seat-engaging surface is strongly chilled and in consequence has a dense, fine-grained structure free from pores. Freedom from porosity of the metal constituting the seat-engaging surface of the valve is insured by so forming the valve tip that a relatively large mass of its metal lies closely adjacent the said surface so that in the casting operation the interior of this mass remains molten longer than the outer portion thereof and affords molten metal which can be drawn upon to compensate for the crystallization shrinkage of the surrounding metal which freezes sooner. This tends to concentrate any porosity at the interior of the larger mass of the tip. In the case of the valve shown in Fig. 1 the valve tip is so formed that the larger mass of the tip lies between the conical seat-engaging surface and the reduced stem part 5$^b$ of the tip. Hence, the said stem part as well as the seat-engaging metal is kept free from porosity. Again, in each case, the construction of the valve is such that the cast tip is very rigidly and firmly secured to the shank by internal stresses that are set up in one or the other of the two valve parts. Thus, in the valve shown in Fig. 1, the construction of the cast tip on casting sets up a strong internal tension in the metal of the tip so that the latter has its taper surfaces drawn against corresponding opposing surfaces of the shank, thereby producing a very strong clamping force. In the case of the valve shown in Fig. 2, the swaging of the shank 23 sets up a reaction between the taper surfaces of the cast tip and of the shank, respectively, with corresponding tension in the metal of the shank which surrounds the tip.

It is to be observed that since the shrinkage of a metal such as stellite on casting is quite considerable, the internal stresses set up are correspondingly large and thus must be borne in mind in designing the valve and stresses great enough to rupture the metal avoided. In Fig. 1, for example, the length of the reduced section 5$^b$ of the tip 5 is so proportioned that the contraction of the tip on casting shall be just sufficient to effect the desired clamping action between the tip and the shank without setting up unduly large stresses in the metal of the tip. The above mentioned non-porous character of the stem part 5$^b$ of the tip insures adequate and reasonably uniform strength for this part of the structure.

With my improved valve construction and process of producing the same large economies are effected in comparison with any other constructions and methods known to me of producing valves of this general character. One notable economy which is effected by casting the hard metal tip on the shank with interlocking relation, is due to the fact that the metal suitable for such casting purpose is available at a much lower price than similar metal purchased in definite forms or shapes. This is notably true in the case of the alloy stellite.

In the present application I make no claim to the method of making my improved valves as much method constitutes the subject of a divisional application Serial No. 693,481, filed by me October 13, 1933.

It will be understood that my invention is not limited to the specific forms of valve construction which have been illustrated and described but that various modifications of the constructions illustrated may be used without departing from my invention as defined in the appended claims.

What I claim is:

1. A composite valve comprising in combination a metal shank part formed with a recess in one end thereof and a seat-engaging part of hard, wear-resisting cast metal disposed partly in the recess of the shank and partly projecting therefrom, the two parts being rigidly secured together by internal stress in the metal of one of said parts.

2. A composite valve comprising in combination a metal shank part formed with a recess in one end thereof and a seat-engaging part of hard, wear-resisting cast metal disposed partly in the recess of the shank and partly projecting therefrom, the two parts being mechanically interlocked and rigidly secured together by internal stress in the metal of one of said parts.

3. A composite valve comprising in combination a metal shank part formed with a recess in one end thereof and a seat-engaging part of hard, wear-resisting cast metal disposed partly in the recess of the shank and partly projecting therefrom, the two parts being rigidly secured together by internal stress in the metal of the seat-engaging part.

4. A composite valve comprising in combination a metal shank part formed with a recess in one end thereof and a seat-engaging part of hard, wear-resisting cast metal disposed partly in the recess of the shank and partly projecting therefrom, the two parts being mechanically interlocked and rigidly secured together by internal stress in the metal of the seat-engaging part.

5. A composite valve comprising in combination a metal shank and a seat-engaging part of hard, wear-resisting metal cast on one end of the shank, the said end of the shank being formed with a socket having walls which form separate tapered internal shoulders against which opposing surfaces of the cast part are forced by internal stress in the metal of the cast part caused by the contraction of said part when cast.

6. A composite valve comprising in combination a stainless steel shank part formed with a recess in one end thereof and a seat-engaging part of stellite disposed partly in the recess of the shank and partly projecting therefrom, the two parts being rigidly secured together by internal stress in the metal of one of said parts.

7. A composite valve comprising in combination a stainless steel shank part formed with a recess in one end thereof and a seat-engaging part of stellite disposed partly in the recess of the shank and partly projecting therefrom, the two parts being rigidly secured together by internal stress in the metal of the seat-engaging part.

EDWARD M. MAY.